United States Patent [19]
Niedermayr et al.

[11] Patent Number: 4,880,992
[45] Date of Patent: Nov. 14, 1989

[54] NON-CONTACTING MEASURING SYSTEM FOR PRECISION CHARACTERISTICS, PARTICULARLY OF INDUSTRIAL ROBOTS

[75] Inventors: Erich Niedermayr, Haar; Robert Griessbach, Siegertsbrunn, both of Fed. Rep. of Germany

[73] Assignee: Siemens Aktiengesellschaft, Berlin and Munich, Fed. Rep. of Germany

[21] Appl. No.: 202,305

[22] Filed: Jun. 6, 1988

[30] Foreign Application Priority Data

Oct. 8, 1987 [DE] Fed. Rep. of Germany ....... 3734086

[51] Int. Cl.$^4$ ............................................. G01N 21/86
[52] U.S. Cl. ............................. 250/561; 250/231 SE; 901/47
[58] Field of Search ............. 250/561, 231 SE; 356/1, 356/4; 901/47

[56] References Cited

U.S. PATENT DOCUMENTS

| | | | |
|---|---|---|---|
| 4,621,926 | 11/1986 | Merry et al. | 356/363 |
| 4,642,781 | 2/1987 | Szonyi | 364/513 |
| 4,651,283 | 3/1987 | Sciaky et al. | 364/477 |
| 4,791,588 | 12/1988 | Onda et al. | 901/47 |

FOREIGN PATENT DOCUMENTS

| | | |
|---|---|---|
| 0145836 | 6/1985 | European Pat. Off. . |
| 0236611 | 9/1987 | Japan ................................... 901/47 |
| 8600557 | 6/1985 | PCT Int'l Appl. . |

OTHER PUBLICATIONS

"Enhancing Robot Performance Measurement", Mar. 1986, The Industrial Robot.
"Theory, Experimental Results & Recommended Standards Regarding the Static Positioning and Orienting Precision of Industrial Robots", Robotics & Computer—Integrated Mfg., vol. 2, No. 3/4, pp. 247–259, (1985).
"Quasi—Static Performance of Robots", Robotics & Computer Integrated Manufacturing, vol. 2, No. 3/4, pp. 261–278, (1985).

Primary Examiner—David C. Nelms
Assistant Examiner—Eric F. Chatmon
Attorney, Agent, or Firm—Hill, Van Santen, Steadman & Simpson

[57] ABSTRACT

A non-contacting measuring system, particularly for industrial robots, for acquiring the position of two coordinate systems, comprising sensors, in particular a stationary coordinate system lying in a measuring plane and of a moving coordinate system, particularly for the acquisition of absolute position and repetitive accuracy of industrial robots, comprises a bipartite measuring system including a precision turn table with a precision sensor comprising a distance sensor and an optical sensor and a planar measuring subject lying in the measuring plane. The distance from the measuring plane and the tilt about the x axis and the y axis are calculated from the distance sensor signals. The rotation about the z axis and the displacement in the x direction and the y direction are calculated by sensing a line pattern.

11 Claims, 5 Drawing Sheets

Non-contacting Measuring System for Precision Characteristics, Particularly of Industrial Robots

BACKGROUND OF THE INVENTION

1. Field of the Invention

The present invention relates to non-contacting measuring systems for acquiring the position of two coordinate systems with sensors, particularly of a stationary coordinate system lying in a measuring plane and of movable coordinate system, particularly for acquiring the absolute precision and repetitive accuracy of industrial robots. The acquisition of the position of two coordinate systems arises not only when concerned with industrial robots (IR) but arises quite generally in automatic processing procedures, for example with machine tools relative to the work pieces to be processed.

2. Description of the Prior Art

Industrial robots offer a repetitive or reproducing accuracy that lies at a few 1/10 mm up to 2–3/100 mm, dependent on the size and working area of the industrial robot. The repetitive accuracy is the capability of the industrial robot to repeatedly approach a tool reference point in the working area with prescribed position and orientation with the indicated precision, whereby identical boundary conditions prevail, for example identical movement path, identical load, speed, type of movement, etc.

In addition to the foregoing, the utilization of the industrial robot for the programming of the positions and movements (teach-in programming) is critical for the formulation of the repetitive accuracy for positioning a tool/workpiece with industrial robots.

When the positions are generated in a purely numerical fashion by sensors (for example, image evaluation systems) or by computer assisted design (CAD) assisted off-line programming systems or, respectively, programs are also merely transferred from other, similarly constructed robot systems, then the absolute precision of the industrial robot is decisive. The absolute accuracy of an industrial robot is therefore the capability of approaching a numerically defined spatial point (position x, y, z plus orientation) with indicated precision with respect to a defined coordinate system. The corresponding dependency of this characteristic on various parameters such as, for example, position or attitude in the working area, motion path, load, etc, must be identified and statistically interpreted for a qualified investigation of industrial robot precision characteristics (Robotics and Computer Integrated Manufacturing, Vol. 2, No. 3/4, 1985, pp. 261–278 and 247–259).

The measurement of the repetitive accuracy of industrial robots was usually undertaken heretofore by measuring sensors or high-accuracy proximity sensors that are arranged in three planes residing perpendicularly to one another, and by a corresponding measuring cube that was secured to the robot hand (European Patent No. 0 136 413). Since the robot with the measuring cube can enter into the measuring corner only from one direction, and expansion, for example approaching the measuring position from different directions, is difficult.

Various measuring methods are known for measuring the absolute precision; these, however, are either extremely involved and expensive or, respectively, are too inaccurate or timeintensive (The Industrial Robot, March 1986, pp. 53–54).

SUMMARY OF THE INVENTION

The object of the present invention is to provide a measuring system of the type set forth above. The acquisition of the relative position of an industrial robot relative to a measuring point forms the basis as an exemplary embodiment.

The above object is achieved, according to the present invention, in a system of the type set forth above which is particularly characterized in that the measuring system is composed of two parts, of a precision turn table with a position sensor, a distance sensor and an optical sensor and, furthermore of a planar measuring subject lying in the measuring plane. The output signals of the distance sensor are acquired in a data processing system and serve for the calculation of the distance of the turn table from the measuring plane and of the tilt about the x axis and of the y axis and the rotation about the z axis and the displacement in the x direction and in the y direction are identified by sensing the measuring subject.

The invention is further characterized in that, for acquiring the relative position, the turn table has an increment generator as a position sensor and the sensors are located at the robot hand, in contrast whereto a mechanical structure such as a measuring plate or measuring cube and having a line disk is arranged as the measuring subject.

According to a feature of the invention the line disk encompasses a plurality of straight lines that, with one exception (half line) extend through the center of the disk, whereas the half line ends in the center for the formation of a zero segment.

According to another feature of the invention, the optical sensor is composed of an optics comprising a diaphragm and a differential photodiode.

According to another feature of the invention, the signals of the differential photo diode are supplied to a differential amplifier and the zero-access crossing of the amplified signal is evaluated.

According to another feature of the invention, a laser measuring system working on the triangulation principle is utilized as the distance sensor.

According to a further feature of the invention, the analog output signal of the distance sensor is digitized and is stored at regular intervals.

According to still another feature of the invention, the tilt about the x axis and the y axis is calculated from the sinusoidal signal curve of the distance sensor values and the displacement of the measuring subject in the z direction is calculated from the mean value of the distance sensor values.

According to another feature of the invention, the zeroaxis crossing of the output signal of the differential photo diode supplies a trigger signal for a register that accepts the momentary state of the turn table.

According to another feature of the invention, the register content corresponds to the angle ($\psi_{1r}, \psi_{2r}$ corresponding to the angles $\psi_{1m}, \psi_{2m}$ in the coordinate system of the turn table) at which the optical axis of the sensor intersects the symmetry line of a straight line on the disk.

According to another feature of the invention, the displacement in the x direction and in the y direction, as well as the rotation about the z axis are calculated from the totality of all angular values, from the position of the zero segment, from the size and orientation of the ellipse and from the geometry of the measurement arrangement.

The invention, as set forth in detail below, resolves the problem with a non-contacting, high-precision measuring system for the acquisition of the relative position between a measuring head secured to the robot hand and line pattern applied to a measuring plate. By stringing these patterns together in regular intervals, the absolute precision (paletting precision, grid precision) referred to this measuring plane can be identified under variable boundary conditions (as initially set forth above). It is also advantageous that the employed measuring subject (measuring plate, measuring cube) can be constructed in a simple (passive) manner, that the arrangement and modification in the working area of the industrial robot is possible in a simple manner and enables a measuring of the interesting work regions. In particular, mechanical structures (orthogonal measuring surfaces, measuring cubes, etc) can thereby utilize line disks (for example coated aluminum foils) manufactured in a photographic process being applied thereto.

An inverted arrangement having a moving measurement subject and a stationary measuring head can definitely be advantageous for applications other than robot mensuration.

Although the relative position between selected measuring planes or measurement objects can be prescribed accurately by appropriate mechanical spacers, a one-time allocation between the measuring plane/zero point of measuring planes and the origin of the industrial robot coordinate system must nonetheless be carried out. This one-time allocation (referencing) preferably occurs by teach-in, since this allocation or, respectively, the referencing must also be carried out in a similar form in the sensor-to-robot coupling or in the industrial robot off-line programming. The referencing already carried out given industrial robot employment is therefore utilized in the method of the present invention in order to reduce the complexity of the measuring job (measuring the spatial points, for example ±0.01 mm, in the working space 2×2×2 m³) taking the required measuring results into consideration.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
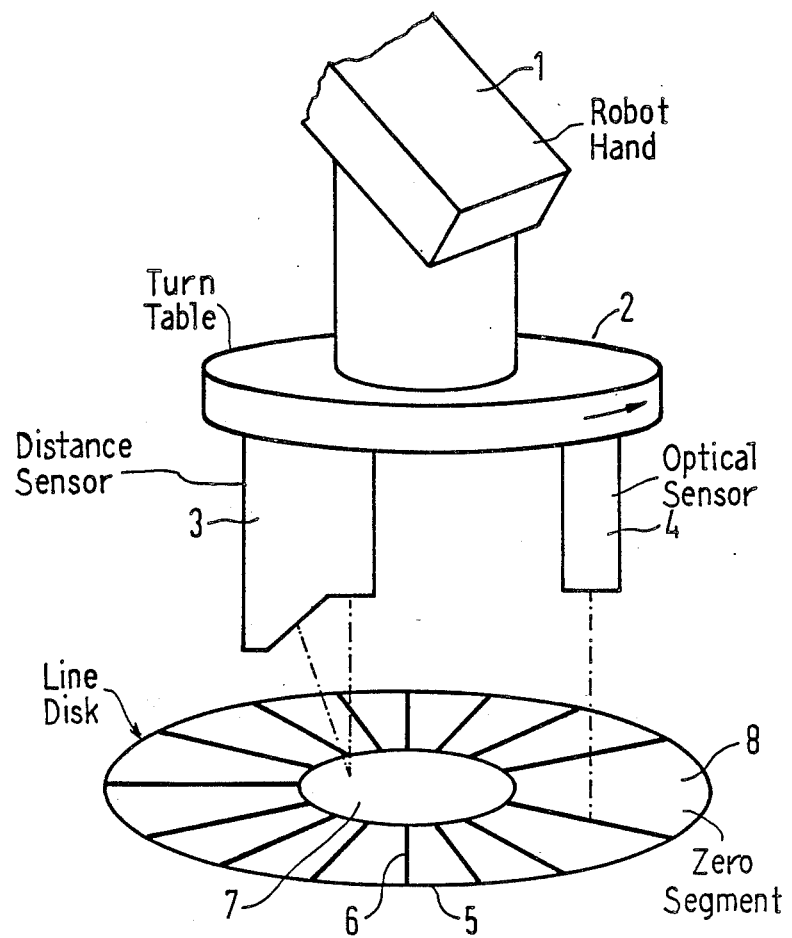
FIG. 1 is a schematic illustration of a measuring system mounted on an industrial robot.

Referring to FIG. 1, a robot hand 1 is connected to a precision turn table 2. Two sensors, namely a distance sensor 3 that, for example, operates on the triangulation principle, and an optical sensor 4, are secured as a path-measuring system to the turn table with an increment generator. A plate 5, having a line pattern, is located in the measuring plane under the sensors 3 and 4. The lines 6 are straight lines that intersect in the center. The intersection is covered by a circle 7. A zero segment 8 that has arisen by omitting a half line is located at the right-hand edge of the plate.

Figure 2:
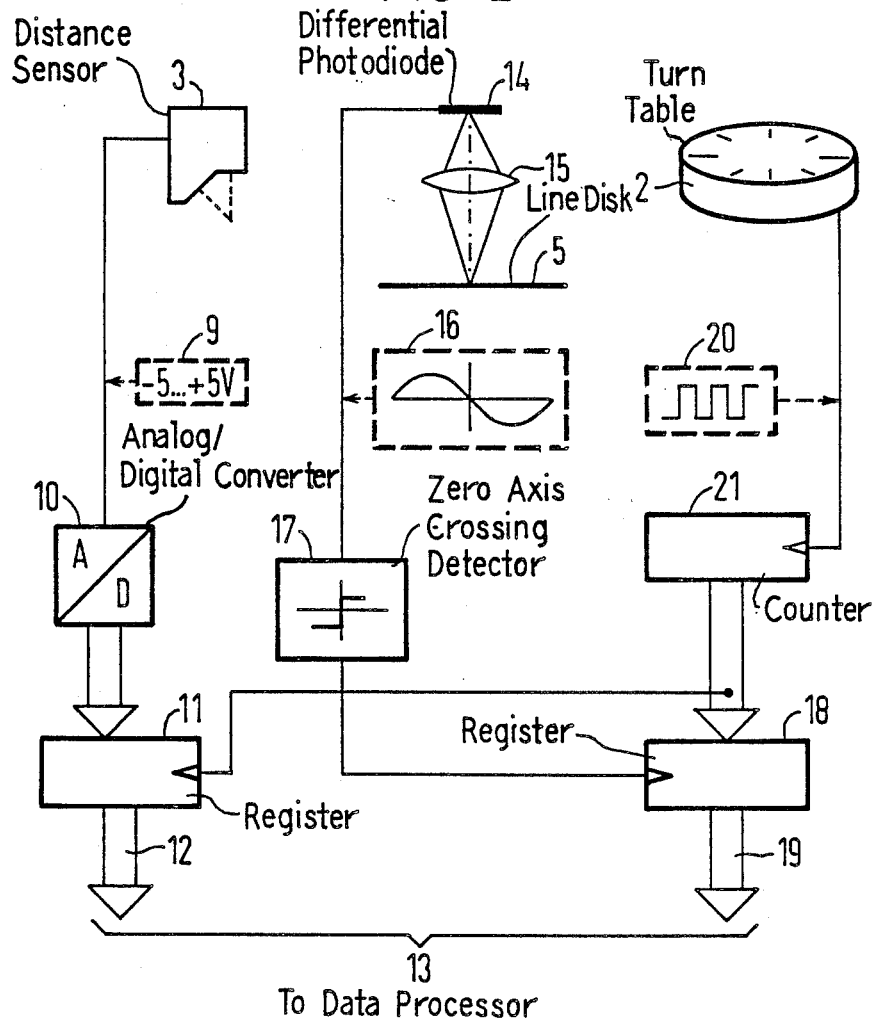
FIG. 2 is a block circuit diagram of the acquisition of the measured values.

The distance sensor 3 is shown in FIG. 2 with an analog output 9. The output signals of the distance sensor are fed to an analog/digital (A/D) converter 10 before they are supplied to a storage register 11. The output 12 of the register 11 is connected to an electronic data processor 13 for interpretation. The optical sensor is composed of a differential photodiode 14 and an optics 15. The plate 5 having the line pattern is located therebelow. The output signal 16 of the differential photodiode is applied by way of a zero-axis crossing detector 17 to the trigger of a register 18 whose output 19 is likewise directly connected to the data processor 13. The output signal 20 of the turntable 2 having the increment generator is applied to a counter 21 that is connected to the trigger input of the register 11 and to the register 18.

For particularly high-quality work procedures, it is necessary to identify the precision with which the industrial robot works. The measurement structure of the invention shown in FIG. 1 serves this purpose. It is approached by the robot and a measuring event is started. The sensor signals of the distance sensor are registered in the register 11 during one revolution of the turn table. The signals of the optical sensor trigger the register 18 and store the counter readings of the increment generator. The distance from the measuring plane and the tilt about the x axis and the y axis can be computationally identified from the distance sensor signals. The rotation about the z axis and the displacement in the x direction and in the y direction is identified by sensing the line pattern and is computationally evaluated. In order to be able to observe the required accuracy, the line position 6 must be capable of being detected with a defined, maximum uncertainty that is independent of the distance of the optics from the line disks and is independent of the illumination. An optics 15 (FIG. 2) comprising a diaphragm and a differential diode 14 as a pick-up device meets these requirements. In order to keep errors due to unsharpness low, the diameter of the diaphragm must be kept as small as possible. The signals of the differential photodiode 14 are supplied to a differential amplifier and the zero-axis crossing of the amplified signal is interpreted in the device 17. In the existing structure, a commercially-available laser measuring system working on the triangulation principle serves as the distance sensor 3.

The evaluation of the signals of the distance sensor and of the optical sensor will be set forth below in conjunction with FIGS. 3-7.

The output signals of the distance sensor 3 are sensed and stored during a complete revolution of the precision turn table. Each time the optical axis of the optical sensor intersects the symmetry line of a line 6, the angular values of the increment generator are likewise stored.

The momentary position of the precision turn table referenced to a zero point is known by adding the increments. The analog output signal of the distance sensor is digitized and the value is stored at regular intervals, as already set forth above. The trigger signal required for that purpose can be directly taken from the increment counter 21. The displacement in the z direction can be calculated from the mean value of the distance sensor values. The tilt about the x axis and the y axis can be calculated from two values respectively offset by 180°. However, a more accurate measured result can be achieved from a series of measured values on the basis of statistical methods (regression analysis).

The identified values from the distance sensor that appear in the form of a sine curve obey the following equation:

$$m(\psi_r) = m_g + R_\theta \tan \delta \cos(\psi_r - \psi_{or})$$

where $\psi_r$ is the control variable, position of the turn table (position sensor or measuring path system), $m_g$ is a constant;

$\psi_{or}$ or is the direction of tilt (major axis direction of the ellipse), and $\delta$ is the amount of tilt.

The calculation of $m_g$, $\delta$, $\psi_{or}$ occurs by minimizing the error squares according to Gauss.

Figure 3:
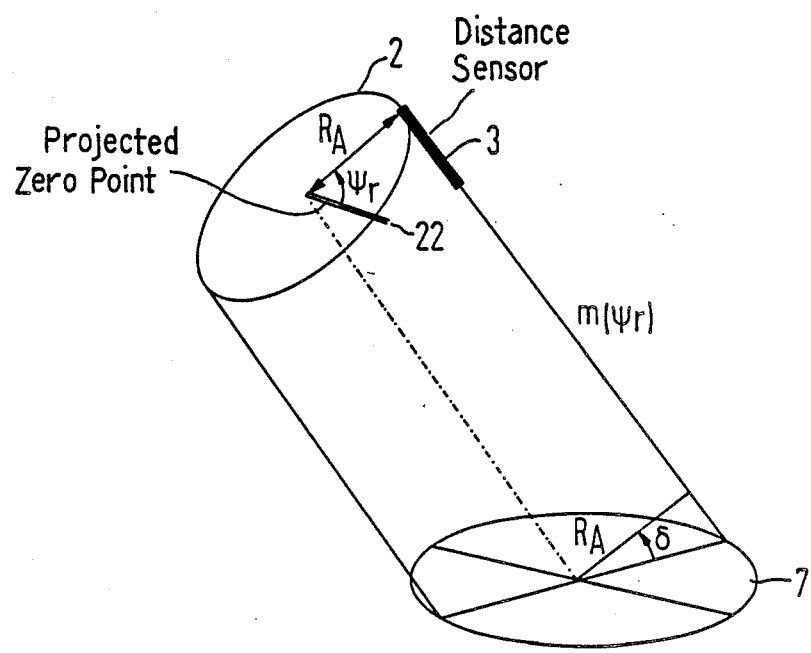
FIG. 3 is a schematic representation of the arrangement of a turn table and a distance sensor.
Figure 4:
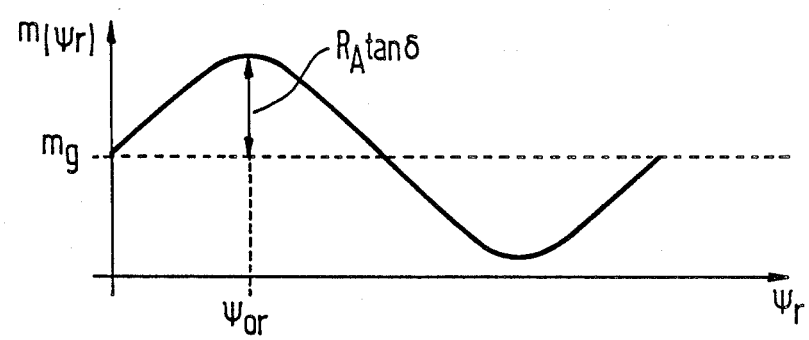
FIG. 4 is a graphic illustration of the output signal of the distance sensor.

The aforementioned values may be read from FIGS. 3 and 4 in which the reference character 22 indicates the zero point of the increment generator and Ra indicates the distance of the distance sensor from the rotational axis.

The axis of the optical sensor intersects the line disk 5 in the form of an ellipse. The orientation and the size of the major axis of the ellipse can be calculated by evaluating the distance sensor signals. The zero-axis crossing of the output signals of the differential diode 14 supplies the trigger signal for the register 18 (FIG. 2) that accepts the momentary status of the turn table 2. The register content therefore corresponds to the angle at which the optical axis of the sensor intersects the line of symmetry of a straight line 6 on the line disk 5.

Figure 5:
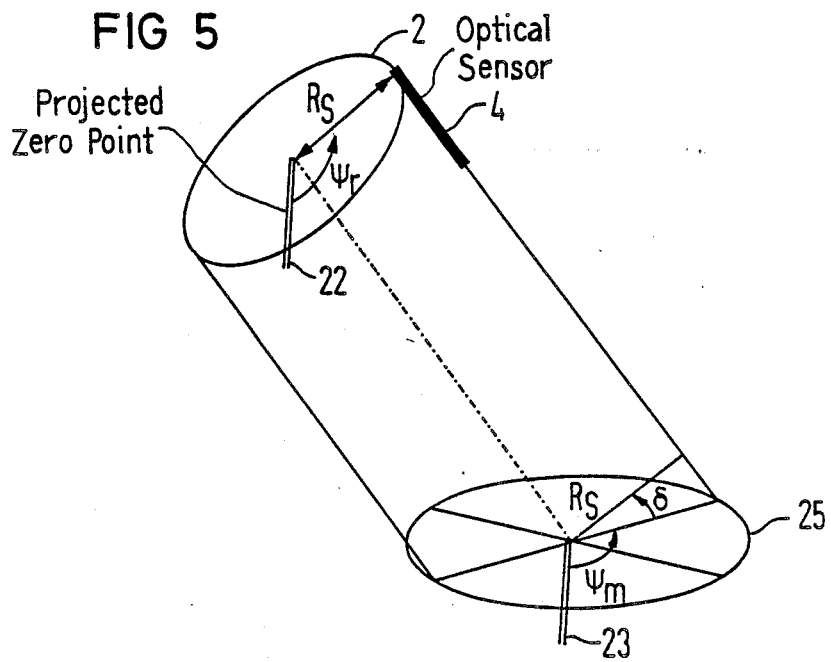
FIG. 5 is a schematic illustration of the arrangement of the line detector.
Figure 6:
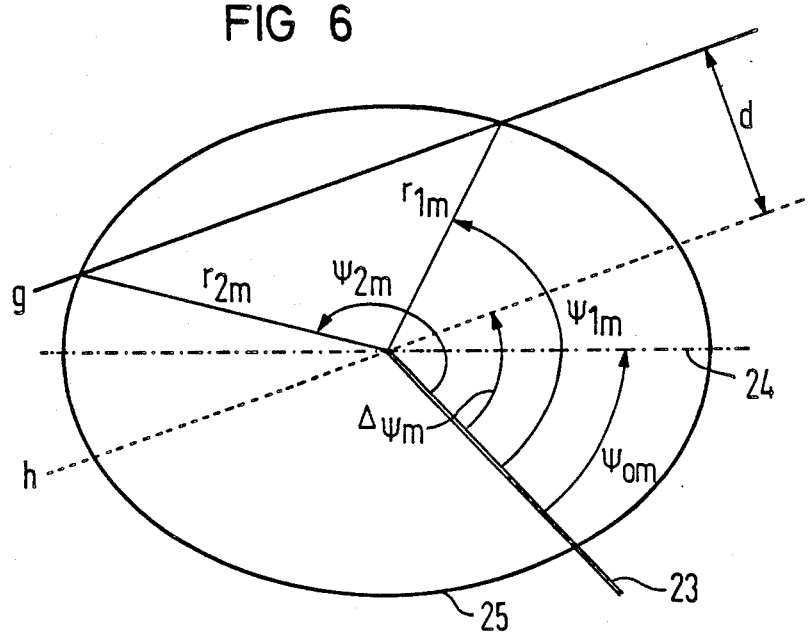
FIG. 6 is a schematic representation of the recognition image of the line detector, given observation of a straight line 6.

FIGS. 5 and 6 serve the purpose of explaining the evaluation of the values of the optical sensor. The reference character 23 relates to the projected zero point of the projected zero point 22 cf the turn table 2. The character $R_s$ is the distance of the optical detector on the rotational axis. The reference character 24 identifies the major axis of the ellipse $\psi_{or}$ (FIG. 4). The reference character h (FIG. 6) marks an auxiliary straight line on which the center of the ellipse 25 lies. This straight line is located at the distance d from the straight line g that is one of the straight lines 6. The angles having the reference r lie in the plane of the turn table 2 and the corresponding angles having the reference character m lie in the measuring plane. The angles $\psi_{1m}$ and $\psi_{2m}$ are the line detector values belonging to the straight lines g. These values are measured in the plane of the turn table 2 and are transformed into the measuring plane.

The size and the orientation of the ellipse 25 can be calculated from the evaluation of the measured distance sensor values and from the geometry of the measurement structure.

An angle $\Delta\psi_m$ is the angle between the projected zero point and the straight line h. Radii $r_{1m}$ and $r_{2m}$ are the radii that can be calculated from $\psi_{1m}$ and $\psi_{2m}$. The distance d of the straight line h from the straight line g can be calculated from the radii $r_{1m}$ and $r_{2m}$. The ideal intersection of all straight lines h is the ellipse center ($x_{em}$, $y_{em}$, FIG. 7) in the measurement coordinate system. This center is identified by minimizing the error squares according to Gauss.

The entire operation is carried out for all straight lines 6.

Figure 7:
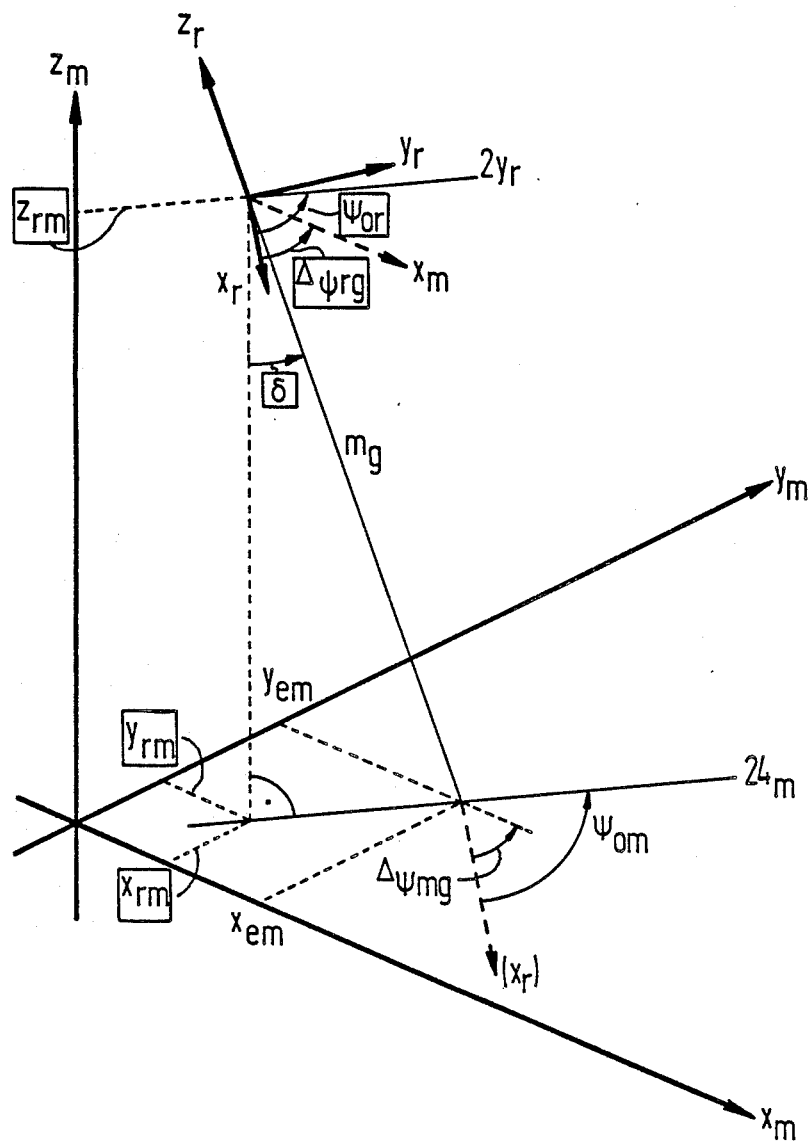
FIG. 7 is a schematic illustration showing the coordinate systems and the position of the quantities calculated from the measured values.

FIG. 7 schematically illustrates the coordinate system ($x_r$, $y_r$, $z_r$) and ($x_m$, $y_m$, $z_m$) and the position of the quantities calculated from the measured values. The values sought are bounded in this figure, i.e. they reside in a box.

The position comprises the references $x_{rm}$, $y_{rm}$, $z_{rm}$ of the coordinate system referenced r in the coordinate system referenced m.

The value $z_{rm}$ is calculated from the values $m_g$ and $\delta$. These values can be taken from FIG. 4. The values $x_{rm}$ and $y_{rm}$ follow from the values $x_{em}$, $y_{em}$, $m_g$ and $\delta$.

The values $\Delta\psi_{mg} + \Delta\psi_{rg}$ derive from the value $\Delta\psi_m$ (FIG. 6) and from the position of the zero segment of the line disc. The displacement in the x direction in the y direction, as well as the rotation about the z axis, as set forth, can be calculated from the totality of all angular values, from the position of the zero segment, from the size and orientation of the ellipse and from the geometry of the measuring arrangement. The result of this test indicates the precision of the robot.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A non-contacting measuring system for acquiring the position of two coordinate systems with respect to one another, comprising:
   a stationary coordinate system lying in a measuring plane, said stationary coordinate system having x, y and z axes;
   a moving coordinate system;
   said measuring system having a turn table with a position sensor, a distance sensor and an optical sensor, said measuring system located in said moving coordinate system;
   a planar measuring subject lying in said measuring plane; and
   a data processing system connected to said distance and optical sensors for acquiring output signals therefrom and calculating the distance of the turn table from the measuring plane and of the tilt about the x axis and the y axis and the rotation about the z axis and the displacement in the x direction and in the y direction in response to output signals received from said measuring subject.

2. The measuring system of claim 1 wherein said position sensor is an increment generator; and said distance and position sensors are located at a robot hand and a mechanical structure, including a line disk, is provided as said measuring subject.

3. The measuring system of claim 2, wherein: said line disk comprises a plurality of straight lines that, with one exception, extend through the center of said disk and wherein, the one exception comprises a half line which extends from the periphery to the center of said disk to form, thereacross, a zero segment.

4. The measuring system of claim 2, wherein:
said optical sensor comprises an optics including a diaphragm and a differential photo diode.

5. The measuring system of claim 4, and further comprising:
a differential amplifier connected to receive the output signals of said differential photo diode for determining the zero-axis crossing of the output signal of said photo diode.

6. The measuring system of claim 2, wherein:
said distance sensor comprises a laser measuring system operating on the triangulation principle.

7. The measuring system of claim 6, wherein:
said distance sensor produces an analog output signal and an analog-to-digital converter for converting said analog signal into digital form; and
storage means for storing said digitized signal at regular intervals.

8. The measuring system of claim 2, and further comprising:
means for calculating the tilt about the x axis and the y axis from the sinusoidal signal curve of the distance sensor values and the displacement of the measuring subject in the z direction from the mean value of the distance sensor values.

9. The measuring system of claim 14, and further comprising:
a register for receiving the momentary status of the turn table, said register receiving a trigger signal indicative of the status of the output of photo diode.

10. The measuring system of claim 9, wherein:
said register includes signals which correspond to the angle $\psi_{1r}$, $\psi_{2r}$ corresponding to the angles $\psi_{1m}$, $\psi_{2m}$) in the coordinate system of the turn table at which the optical axis of the sensor intersects the symmetry line of a straight line on the line disk.

11. The measuring system of claim 2, and further comprising:
means for calculating the displacement in the x direction and in the y direction as well as the rotation about the z axis from the totality of all angular values from the position of the zero segment from the size and orientation of an ellipse scanned by the sensors and from the geometry of the measuring arrangement.

* * * * *